Sept. 21, 1965     D. E. STEER ETAL     3,207,172
VALVE CORE
Filed March 29, 1965     2 Sheets-Sheet 1
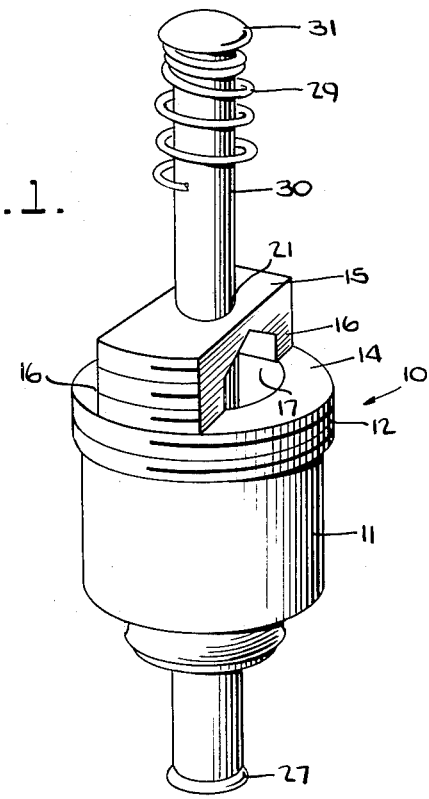
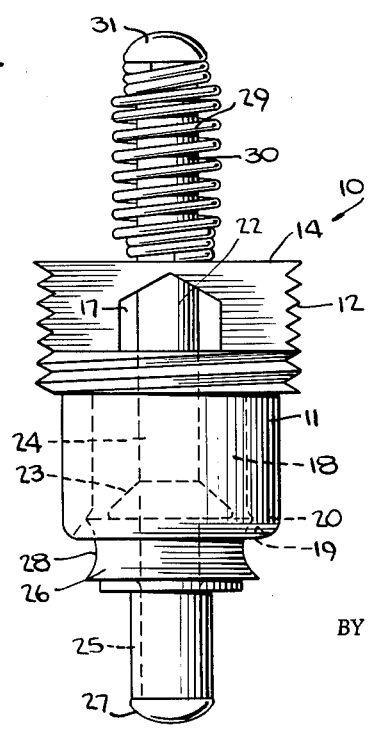
INVENTORS
DONALD E. STEER
JOSEPH W. SMITH
BY
Kenyon & Kenyon
ATTORNEYS

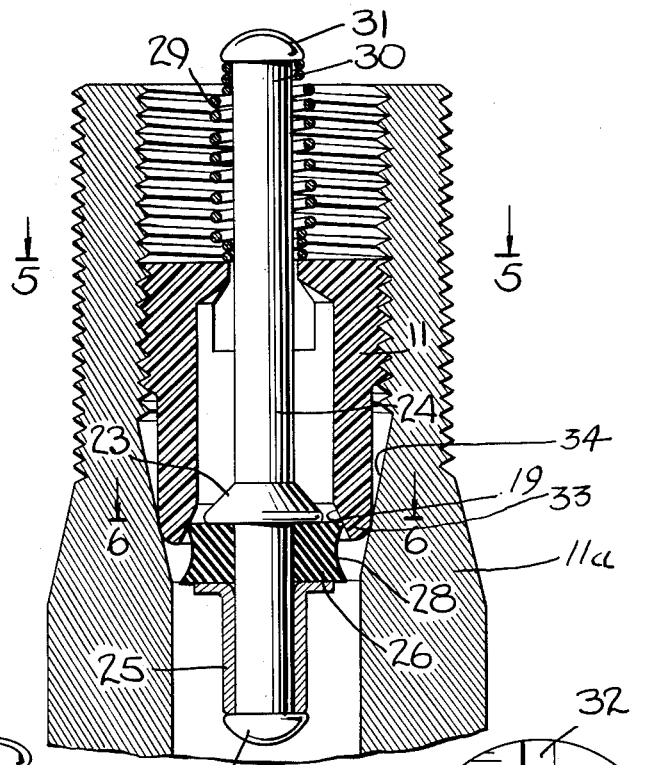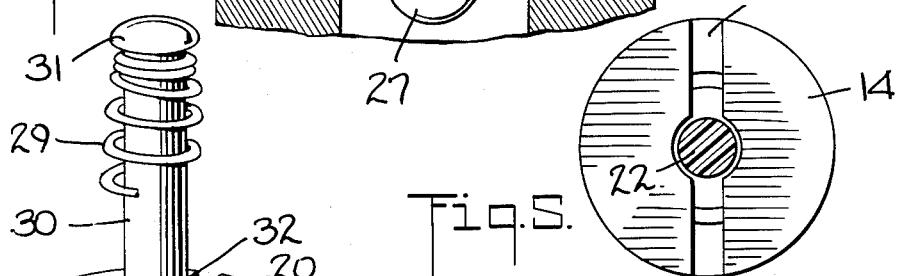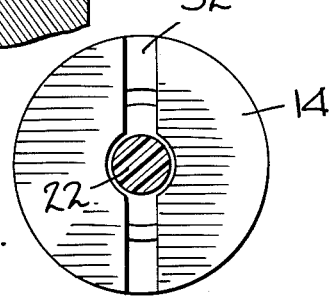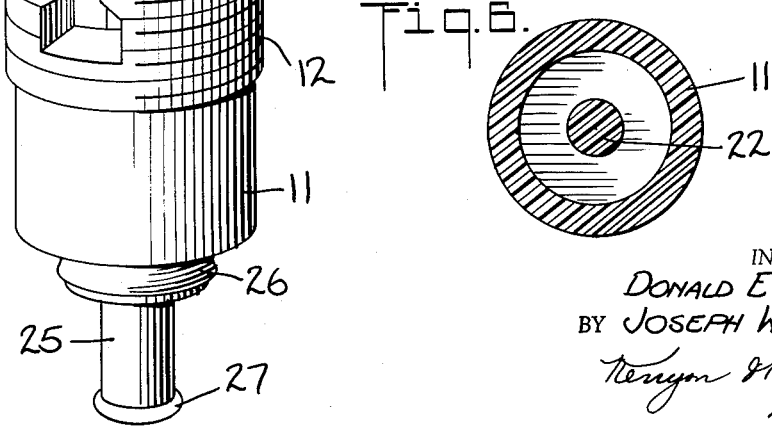

United States Patent Office 3,207,172
Patented Sept. 21, 1965

3,207,172
VALVE CORE
Donald E. Steer, 318 Burbank Ave., Stratford, Conn., and Joseph W. Smith, Sherwood Road, Easton, Conn.
Filed Mar. 29, 1965, Ser. No. 447,594
4 Claims. (Cl. 137—234.5)

This application is a continuation-in-part of application Serial No. 200,532, filed June 6, 1962, now abandoned.

This invention relates to valve cores and more particularly to a novel valve construction.

It is an object of the present invention to provide a valve core constructed of the sealing material that seals the stem of the core.

Another object is to provide a valve core in which the end of the barrel is used as the point of seal in the valve into which it is inserted and also the point of seal for the rubber washer which acts as the opening and closing seal of the valve core.

Briefly the present invention comprises a molded nylon cylindrical barrel having an axial bore extending through said barrel and having an external threaded portion thereon near a first end of said barrel adapted for threaded engagement with the interior threads of a valve member. Said first end of said barrel has a restricted opening of said bore. There is an outwardly tapered bearing surface at the second end of the barrel. A plastic cylindrical elongated stem with enlarged ends is disposed within the barrel in an axial relationship therewith. Said stem has emergent portions at both ends of the barrel and is slidably received by the restricted opening. An integrally formed collar member is provided on the stem adjacent the second end of the barrel and a flanged retaining sleeve is included on the stem with a resilient washer having a concave peripheral surface being held on the stem between the collar member and the sleeve. Spring means biases the stem outwardly from the first end of the barrel whereby the washer is compressed against the bearing surface in sealing relationship therewith.

Other objects and features of the invention will become apparent in the specification and claims and in the drawings in which:

FIG. 1 is a perspective view of a valve core according to the present invention;

FIG. 2 is a side elevation of the valve core of FIG. 1;

FIG. 3 is a vertical partially sectioned view of another embodiment of the invention mounted in a valve member;

FIG. 4 is a perspective view of the alternate embodiment of the valve core;

FIG. 5 is a section of the valve core taken along lines 5—5 of FIG. 3; and

FIG. 6 is a section of the valve core taken along lines 6—6 of FIG. 3.

Referring now to the drawings, FIGS. 1 and 2 show a valve core designated generally by reference numeral 10 having a cylindrical barrel 11 which is made of nylon or other suitable plastic and can be machined but is preferably fabricated by a molding operation in any conventional manner known to those skilled in the art. Barrel 11 has a threaded portion 12 on its outer surface adjacent its upper end 14 which is in the form of the standard valve core bridge, having a raised transverse portion 15 and cut away side portions 16 with openings 17 (one shown) communicating with the interior axial bore 18 extending longitudinally of cylindrical barrel 11.

Barrel 11 has an axial bore 18 and an outwardly tapered surface 19 at its lower end 20 and a restricted opening 21 at its upper end 14. Valve stem 22 is disposed in axial alignment with bore 18 and has an integrally formed collar 23 thereon on its lower portion 24. Flanged sleeve 25 is disposed on lower end portion 24 with its flanged portion facing collar 23. Rubber washer 26 is held captive on stem 22 between collar 23 and sleeve 25, the latter being retained on stem 22 by enlarged stem end 27.

Washer 26 preferably has a concave shaped periphery 28. Spring means such as coil spring 29 is disposed around the upper end 30 of stem 22 and is held thereon by enlarged upper stem end 31 to bias stem 22 upwardly relative to barrel 11 as viewed in FIGS. 1 and 2 and urge washer 26 against tapered seal 19 into a normally closed position of the valve core. An alternate embodiment of the valve core is shown in FIGS. 4-6 which differs from the first described embodiment in that it has a barrel 11 with a threaded portion 12 on its upper end having a radial slot 32 extending across the upper end 14 which communicates with the restricted opening 20 as shown. In all other respects the structure of the alternate embodiment is the same as the one previously described.

Assembly of the above structure is relatively simple. The valve stem 22 is fabricated with collar member 23 thereon and resilient washer 26 is slipped over the lower end portion seating against collar member 23. The flanged sleeve 25 is placed on valve stem 22 with its flanged end against washer 26 and the end 27 of the stem flattened out by the application of heat or other suitable means to provide the enlarged end shown. Then the stem 22 is inserted through the tapered end 19 of the barrel member 11, upper end 30 extending through restricted opening 21 at the upper end 14 of the barrel 11 (see FIGS. 2 and 3). Coil spring 6 is slipped over the upper end 30 of the valve stem 22 and then the upper end 31 of the valve stem 22 is enlarged by conventional means to retain coil spring 29 thereon. The assembled valve core may then be screwed into the standard type of valve body 11a for use (see FIG. 3).

When screwed in place it can be seen that the lower or inner end 33 of the barrel 11 bears against the downwardly and inwardly tapered face 34 of the valve body 11a, providing the static seal for the valve core and valve body assembly. The dynamic seal is thus disposed immediately adjacent the static seal and is provided by washer 26 and tapered seal surface 19 on barrel 11.

Thus it can be seen that by having the static and dynamic seals located at the inner end of the barrel the overall axial length thereof can be substantially shortened in comparison with valve cores of the prior art and a much more compact structure provided.

This valve core is adapted for use in any conventional type of valve member or the like and provides a rugged core of economic construction and further will not corrode or have the other normal undesirable characteristics encountered in metallic valve cores.

It is conceivable under certain circumstances that the spring means 29 can be disposed with and the pressure of the confined gas against the sleeve 25 and washer 26 utilized to maintain the core in the closed position.

It is to be understood that changes and additions may be made by those skilled in the art within the scope and spirit of the invention.

What is claimed is:
1. A valve core adapted for incorporation within a valve body comprising a unitary molded plastic cylindrical barrel having an axial bore extending through said barrel and an external threaded portion thereon near a first end of said barrel adapted for threaded engagement with the interior threads of said valve body, the second end of said barrel adapted by itself to provide a static seal with respect to said valve body, said first end of said barrel having a restricted opening of said bore, an outwardly tapered bearing surface in said bore at the second end of said barrel, a molded plastic cylindrical elongated stem with enlarged ends disposed within said barrel in an axial relationship therewith, said stem having emergent portions at both ends of said barrel, said stem slideably received by said restricted opening, an integrally formed collar member on said stem adjacent said second end of said barrel, a flanged retaining sleeve on said stem adjacent said collar member, said sleeve being retained on said stem by the adjacent enlarged end of said stem, a rubber washer having a diameter greater than the diameter of said bore and being held on said stem between said collar member and said sleeve, said washer being compressible against said bearing surface in sealing relationship therewith by movement of said stem axially outward from said first end.

2. A valve core adapted for incorporation within a valve body comprising a unitary molded plastic cylindrical barrel having an axial bore extending through said barrel and an external threaded portion thereon near a first end of said barrel adapted for threaded engagement with the interior threads of said valve body, the second end of said barrel adapted by itself to provide a static seal with respect to said valve body, said first end of said barrel having a restricted opening of said bore, an outwardly tapered bearing surface in said bore at the second end of said barrel, a molded plastic cylindrical elongated stem with enlarged ends disposed within said barrel in an axial relationship therewith, said stem having emergent portions at both ends of said barrel, said stem slideably received by said restricted opening, an integrally formed collar member on said stem adjacent said second end of said barrel, a flanged retaining sleeve on said stem adjacent said collar member, said sleeve being retained on said stem by the adjacent enlarged end of said stem, a rubber washer having a diameter greater than the diameter of said bore and being held on said stem between said collar member and said sleeve, said stem movable outwardly from said first end whereby said washer is compressed against said bearing surface in sealing relationship therewith, and spring means disposed on said stem externally of said first end of said barrel and abutting said first end of said barrel and being retained on said stem by the adjacent enlarged end thereof for urging said washer against said bearing surface.

3. A valve core adapted for incorporation within a valve body comprising a unitary molded nylon cylindrical barrel having an axial bore extending through said barrel and an external threaded portion thereon near a first end of said barrel adapted for threaded engagement with the interior threads of said valve body, the second end of said barrel adapted by itself to provide a static seal with respect to said valve body, said first end of said barrel having a restricted opening of said bore, an outwardly tapered bearing surface in said bore at the second end of said barrel, a molded nylon cylindrical elongated stem with enlarged ends disposed within said barrel in an axial relationship therewith, said stem having emergent portions at both ends of said barrel, said stem slideably received by said restricted opening, an integrally formed collar member on said stem adjacent said second end of said barrel, a flanged retaining sleeve on said stem adjacent said collar member, said sleeve being retained on said stem by the adjacent enlarged end of said stem, a rubber washer having a diameter greater than the diameter of said bore and being held on said stem between said collar member and said sleeve, said stem movable outwardly from said first end whereby said washer is compressed against said bearing surface in sealing relationship therewith, and spring means disposed on said stem externally of said first end of said barrel and abutting said first end of said barrel and being retained on said stem by the adjacent enlarged end thereof for urging said washer against said bearing surface.

4. A valve core adapted for incorporation within a valve body comprising a unitary molded nylon cylindrical barrel having an axial bore extending through said barrel and an external threaded portion thereon near a first end of said barrel adapted for threaded engagement with the interior threads of said valve body, the second end of said barrel adapted by itself to provide a static seal with respect to said valve body, said first end of said barrel having a restricted opening of said bore, an outwardly tapered bearing surface in said bore at the second end of said barrel, a molded nylon cylindrical elongated stem with enlarged ends disposed within said barrel in an axial relationship therewith, said stem having emergent portions at both ends of said barrel, said stem slideably received by said restricted opening, an integrally formed collar member on said stem adjacent said second end of said barrel, a flanged retaining sleeve on said stem adjacent said collar member, said sleeve being retained on said stem by the adjacent enlarged end of said stem, a rubber washer having a diameter greater than the diameter of said bore and having a concave peripheral surface, said washer being held on said stem between said collar member and said sleeve, said stem movable outwardly from said first end whereby said washer is compressed against said bearing surface in sealing relationship therewith, and spring means disposed on said stem externally of said first end of said barrel and abutting said first end of said barrel and being retained on said stem by the adjacent enlarged end thereof for urging said washer against said bearing surface.

No references cited.

ISADOR WEIL, *Primary Examiner.*

MARTIN P. SCHWADRON, *Examiner.*